United States Patent
Lemke et al.

(10) Patent No.: US 11,094,435 B2
(45) Date of Patent: Aug. 17, 2021

(54) BUSHING ELEMENT AND SYSTEM COMPOSED OF A SEPARATOR AND A BUSHING ELEMENT

(71) Applicant: VOLKSWAGEN AKTIENGESELLSCHAFT, Wolfsburg (DE)

(72) Inventors: Andreas Lemke, Ummendorf (DE); Frank Wesche, Velpke (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/460,178

(22) Filed: Jul. 2, 2019

(65) Prior Publication Data
US 2020/0005971 A1    Jan. 2, 2020

(30) Foreign Application Priority Data
Jul. 2, 2018 (DE) ...................... 10 2018 210 841.2

(51) Int. Cl.
*H01B 17/30* (2006.01)
*H02G 3/22* (2006.01)
(Continued)

(52) U.S. Cl.
CPC ........ *H01B 17/303* (2013.01); *B60R 16/0222* (2013.01); *H01B 17/583* (2013.01);
(Continued)

(58) Field of Classification Search
CPC . H01B 17/303; H01B 17/583; H01L 317/303; H01L 317/583; B60R 16/0222; H02G 3/088; H02G 3/22; H02G 3/083
See application file for complete search history.

(56) References Cited

U.S. PATENT DOCUMENTS 3,825,320 A * 7/1974 Redfern ............... G02B 6/4428
                                                        385/138
5,233,730 A * 8/1993 Milne ................... E21D 21/006
                                                        24/136 R
(Continued)

FOREIGN PATENT DOCUMENTS

CA         2113923 A1    2/1993
CN       100336243 C     9/2007
(Continued)

*Primary Examiner* — Steven T Sawyer
*Assistant Examiner* — Paresh H Paghadal
(74) *Attorney, Agent, or Firm* — Pearl Cohen Zedek Latzer Baratz LLP

(57) ABSTRACT

The invention relates to a bushing element for providing an electrically conductive connection through a separator, comprising an element body for positive or at least substantially positive insertion into a bushing receptacle of the separator, the element body comprising a continuously electrically conductive conducting portion for providing the electrically conductive connection and at least one electrically insulating portion for insulating the conducting portion against an inner surface of the bushing receptacle that encloses the conducting portion peripherally at least in part. The invention further relates to a system that is composed of a separator and a bushing element for providing an electrically conductive connection through the separator, the separator having a bushing receptacle into which the bushing element is inserted in a positive or at least substantially positive manner.

4 Claims, 7 Drawing Sheets

(51) Int. Cl.
 *H02G 3/08* (2006.01)
 *B60R 16/02* (2006.01)
 *H01B 17/58* (2006.01)

(52) U.S. Cl.
 CPC ............. *H02G 3/083* (2013.01); *H02G 3/088* (2013.01); *H02G 3/22* (2013.01)

(56) References Cited

U.S. PATENT DOCUMENTS

| | | | |
|---|---|---|---|
| 5,773,759 A * | 6/1998 | Hablutzel | H01R 4/646 |
| | | | 174/653 |
| 10,008,362 B1 * | 6/2018 | Sprengers | H01J 37/185 |
| 2003/0054702 A1 | 3/2003 | Ferderer | |
| 2003/0118892 A1 | 6/2003 | Ray, Jr. et al. | |
| 2003/0207610 A1 | 11/2003 | Lindemann et al. | |
| 2006/0039749 A1 * | 2/2006 | Gawehn | F16B 5/025 |
| | | | 403/367 |
| 2010/0089639 A1 * | 4/2010 | Bousquet | H02G 3/22 |
| | | | 174/652 |
| 2011/0028050 A1 | 2/2011 | Stromiedel | |
| 2012/0216791 A1 | 8/2012 | Munzenberger | |
| 2017/0054342 A1 * | 2/2017 | Guntermann | H01B 17/301 |
| 2018/0138573 A1 | 5/2018 | Lilge | |

FOREIGN PATENT DOCUMENTS

| | | |
|---|---|---|
| CN | 201191662 Y | 2/2009 |
| CN | 201262986 Y | 6/2009 |
| CN | 201425591 Y | 3/2010 |
| DE | 3214487 A1 | 10/1983 |
| DE | 19836631 A1 | 3/2000 |
| DE | 10145324 A1 | 4/2003 |
| DE | 10205369 A1 | 8/2003 |
| DE | 10220108 A1 | 11/2003 |
| DE | 102009035716 A1 | 2/2011 |
| DE | 102011004575 A1 | 8/2012 |
| DE | 102014116724 A1 | 5/2016 |
| DE | 10 2015 103 053 A1 | 9/2016 |
| EP | 1294053 A2 | 3/2003 |
| EP | 2784364 A1 | 10/2014 |
| GB | 1076936 A | 7/1967 |
| WO | WO2007118515 A1 | 10/2007 |

\* cited by examiner

BUSHING ELEMENT AND SYSTEM COMPOSED OF A SEPARATOR AND A BUSHING ELEMENT

FIELD OF THE INVENTION

The present invention relates to a bushing element for providing an electrically conductive connection through a separator, comprising an element body for positive or at least substantially positive insertion into a bushing receptacle of the separator, the element body comprising a continuously electrically conductive conducting portion for providing the electrically conductive connection and at least one electrically insulating portion for insulating the conducting portion against an inner surface of the bushing receptacle that encloses the conducting portion peripherally at least in part. Furthermore, the present invention relates to a system that is composed of a separator and a bushing element for providing an electrically conductive connection through the separator, the separator having a bushing receptacle into which the bushing element is inserted in a positive or at least substantially positive manner.

BACKGROUND OF THE INVENTION

In modern engineering, it is always necessary to provide an electrically conductive connection through a separator, for example a housing. Known options include a plug as the end of an electrical cable assembly that is inserted into a socket that is arranged in the separator, the socket enabling an electrical feedthrough through the separator to be provided. Other examples of feedthroughs include combined cable bushings or PG glands. However, what the known bushing elements have in common is that they often have a complicated mechanical structure that is oftentimes composed of a large number of individual components and are therefore costly. For instance, DE 198 36 631 A1 discloses a plug connection for providing a feedthrough through a separator in which a multicore cable is clamped in a plug of the plug connection, with a contacting of the wires of the cable being ensured by cutting blades. The corresponding plug socket is arranged in the separator. Another plug connection is known from DE 45 208 324 A1. In this implementation, a cable is clamped directly into a socket that is arranged in the separator. To make this clamping reliable, a clamping sleeve, a plurality of clamping surfaces and a displaceable, particularly removable, wedge element are proposed.

The above-described known bushing elements thus each have a plurality of individual structural components, the interaction of which enables the actual bushing for electrical conduction between the surfaces of the separator to be provided. Due to the somewhat complicated structure—which, in particular, has many boundary surfaces—electrical insulation is often also laborious; in particular, an additional fluid tightness cannot be automatically guaranteed or can at least be rendered difficult.

SUMMARY OF THE INVENTION

It is therefore the object of the invention to at least partially overcome the disadvantages described above with bushing elements and systems with such bushing elements. In particular, it is the object of the invention to provide a bushing element and a system composed of a separator and a bushing element which provide a mechanically especially simple electrical feedthrough through the separator in a simple and cost-effective manner, with the particular effect of making electrical insulation possible as well as, preferably, a fluid-tight sealing of the separator as well.

The above object is achieved by the claims. In particular, the object is achieved by a bushing element according to an independent claim and by a system composed of a separator and a bushing element according to an independent claim. Additional advantages of the invention follow from the subclaims, the description, and the drawing. As will readily be understood, features that are described in connection with the bushing element according to the invention are also applicable in connection with a system according to the invention and vice versa, so that reciprocal reference is and can always be made with respect to the disclosure concerning the individual aspects of the invention.

According to a first aspect of the invention, the object is achieved by a bushing element for providing an electrically conductive connection through a separator, comprising an element body for positive or at least substantially positive insertion into a bushing receptacle of the separator, the element body comprising a continuously electrically conductive conducting portion for providing the electrically conductive connection and at least one electrically insulating portion for insulating the conducting portion against an inner surface of the bushing receptacle that encloses the conducting portion peripherally at least in part. A bushing element according to the invention is characterized in that the element body has a first end face, a second end face opposite the first end face, and a lateral face connecting the first end face and the second end face, with the first end face having a larger cross-sectional area than the second end face, and with the lateral face being formed peripherally by the insulating portion at least in part.

A bearing element according to the invention is provided for the purpose of providing an electrically conductive connection through a separator. It is particularly preferred if a bushing receptacle is located in the separator into which the bushing element can be inserted in a positive manner or at least substantially in a positive manner. The electrical conductivity of the bushing element according to the invention is ensured by a continuously electrically conductive conducting portion. In terms of the invention, "continuously electrically conductive" means particularly that the conducting portion extends completely through the separator when a bushing element is inserted into an bushing receptacle and can preferably be contacted in an electrically conductive manner on both sides of the separator. In this way, an electrically conductive connection between the two sides of the separator can thus be produced by the conducting portion. Furthermore, the element body of the bushing element also has an electrically insulating portion at least in the portion of the element body of the bushing element that is in contact with an inner surface of the bushing receptacle when the bushing element is inserted into the bushing receptacle. Insulation of the conducting portion against this inner surface of the bushing receptacle and thus against the entire separator can thus be ensured. In particular, a provision can be made in this way that a bushing element according to the invention can be used independently of a choice of the material of the separator. In other words, the separator in which a bushing element according to the invention is inserted can be both electrically insulating and electrically conductive, the bushing element according to the invention making it possible for an electrically conductive line to be provided independently of this configuration without fear of electrical energy flowing through the bushing element jumping to the separator or vice versa.

According to the invention, the element body of a bushing element has a special shape, particularly two end faces that are connected by a lateral face. According to the invention, the first end face in particular has a larger cross-sectional area than the second end face. In other words, the element body is thus preferably embodied as a truncated pyramid, it being possible for the shape of the two end faces to be the same or different. Preferably, the two end faces can also be arranged so as to be centered relative to one another. In order to ensure the positive or at least substantially positive insertion of the bushing element into the bushing receptacle, a provision can be preferably made that the bushing receptacle also has a shape that is adapted to the element body. In other words, the bushing receptacle can also preferably have a shape that is such that, on a first surface of the separator, the bushing receptacle has a larger first receiving opening than a second receiving opening on a second surface opposite the first surface. By virtue of the inventive shape of the element body, it can thus be ensured in particular that, through the positive fit of the bushing element in the bushing receptacle, the bushing element rests with its lateral face, particularly through the insulating portion, preferably around the periphery or at least substantially around the periphery, and continuously or at least substantially, against the inner surface of the bushing receptacle. An especially secure arrangement of the bushing element in the bushing receptacle can be provided in this way. Furthermore, the bushing element according to the invention or the element body thereof has essentially only the conducting portion and the insulating portion, thus enabling a bushing element according to the invention to have an especially simple design. Preferred areas of application of a bushing element according to the invention can be in automotive engineering, for example; in particular, the separator in which a bushing element according to the invention is arranged can be a housing of a battery of a vehicle, for example.

Preferably, a provision can be made in the bushing element according to the invention that the element body, particularly the conducting portion, is frustoconical or is at least substantially frustoconical in shape. A frustum represents an especially simple shape in which a first end face has a larger cross-sectional area than a second end face opposite the first end face. In particular, a frustum is also rotationally symmetrical, whereby the manufacture and, in particular, arrangement of a bushing element according to the invention in the bushing receptacle can be facilitated. The introduction of the bushing receptacle into the separator—it being possible for the bushing receptacle to also be frustoconical or at least substantially frustoconical in this embodiment as well—can also be performed in an especially simple and straightforward manner.

A bushing element according to the invention can also be characterized in that the insulating portion, whose purpose it is to provide for a fluid-tight sealing of the bushing receptacle, has at least one sealing surface for positive abutment against at least one mating sealing surface of the inner surface of the bushing receptacle. In this preferred embodiment of a bushing element according to the invention, it can also be used in addition to the electrical insulation through the insulating portion to provide for a separation of fluid spaces that are separated from one another by the separator. The sealing surface is preferably arranged peripherally around the entire element body on the insulating portion, so that the sealing surface—which, in the inserted state, abuts in a positive manner against the mating sealing surface of the inner surface of the bushing receptacle—can be sealed off in an especially secure manner and also peripherally. The inventive, preferably truncated pyramid-like, especially preferably frustoconical shape of the element body of the bushing element is also advantageous with respect to this seal, because it enables the positive engagement of the entire element body in the bushing receptacle to be further improved in order to provide the seal.

Especially preferably, a bushing element according to the invention can be formed in such a way that the bushing element for fixing the element body in the bushing receptacle has a fixing device for exerting a fixing force in a fixing direction on the element body, the fixing direction of the fixing force pointing at least substantially from the first end face to the second end face. Such a fixing device makes it possible to ensure a secure and, in particular, fixed arrangement of the bushing element, particularly of the element body of the bushing element, in the bushing receptacle. The fixing device exerts a fixing force on the element body of the bushing element. By virtue of the fixing direction of the fixing force being oriented at least substantially from the first end face to the second end face, the element body in particular is thus pressed with its smaller second end face into the bushing receptacle. Through the positive fit between the element body and the bushing receptacle and the simultaneously acting fixing force, the arrangement and, in particular, the retention of the bushing element in the bushing receptacle can thus be ensured.

According to a first further development of a bushing element according to the invention, a provision can also be made that the fixing device has a first spring element for exerting a pressing fixing force on the first end face, the first spring element having at least one first supporting portion for supporting against a first mating supporting portion on a first surface of the separator and a first lead-in portion for introducing the fixing force into a first mating lead-in portion on the first end face. In this first embodiment, the fixing device is arranged on the side of the bushing element on which the first end face of the element body is located. In order to generate the fixing force, the fixing device has, in particular, a first spring element. This spring element can be supported by means of a first supporting portion on a first surface, particularly on a first mating supporting portion, of the separator and introduce the fixing force in a first mating lead-in portion against the first end face of the element body via a first lead-in portion. In other words, the first spring element is braced between the mating supporting portion on the first surface of the separator and the first mating lead-in portion on the first end face of the element body, whereby the pressing fixing force is generated on the first end face in the direction of the second end face.

According to an alternative or additional further development of a bushing element according to the invention, a provision can also be made that the fixing device has a second spring element for exerting a tensile fixing force on the second end face, the second spring element having at least one second supporting portion for supporting against a second mating supporting portion on a second surface of the separator and a second lead-in portion for introducing the fixing force into a second mating lead-in portion on the second end face. In this second, alternative or additional embodiment, the fixing device has, in particular, a second spring element, in which case the fixing force acts here as a tensile fixing force on the second end face of the element body. Here, too, the second spring element—particularly a second supporting portion of the second spring element—is supported on a second mating supporting portion on a second surface of the separator and introduces the tensile fixing force via a second lead-in portion into a second mating lead-in portion on the second end face. In other words, in this embodiment, the second spring element is braced between the second surface—particularly the second mating supporting portion on the second surface—and the second mating lead-in portion on the second end face of the element body, whereby a fixing force is exerted as a tensile fixing force on the second end face. The element body and hence the entire bushing element is thus pulled into the bushing receptacle in this embodiment.

Preferably, a bushing element according to the invention can be further developed in such a way that the fixing force has a—particularly adjustable—opening threshold value for terminating the fixing of the element body in the bushing receptacle in the event of an opening force acting on the element body counter to the fixing direction that is greater than the opening threshold value. A fixing force is exerted by the fixing device on the element body, the fixing direction of this fixing force being embodied such that the bushing element is pressed and/or pulled into the bushing receptacle in the direction of its second, smaller end face. In this embodiment, this fixing force now has a—particularly adjustable—opening threshold value. In other words, in this embodiment, an opening force acting counter to the fixing direction can push the element body and hence the bushing element at least partially out of the bushing receptacle as soon as the opening force is greater than this opening threshold value. In other words, the positive engagement of the bushing element in the bushing receptacle is terminated in case of an opening force that is greater than the opening threshold value. A preferably provided adjustment of the opening threshold value makes it possible, in particular, to set the quantity of the respectively required opening force. Particularly in the case of a fluid-tight arrangement of the bushing element in the bushing receptacle, the seal is thus released and fluid can flow out through the bushing receptacle. Use of a bushing element according to the invention as a pressure relief valve can thus be made possible.

A provision can also be made in a bushing element according to the invention that, in order to positively retain the element body in the bushing receptacle, the bushing element has a retaining element, the retaining element having at least one element retaining portion for positively contacting a mating element retaining portion of the element body and a separator retaining portion for positively contacting a mating separator retaining portion of the separator. In this further additional or alternative embodiment, a secure arrangement and retention of the bushing element in the bushing receptacle can be ensured by the retaining element. In particular, by virtue of the positive fits between the holding member and of the element body or the separator, respectively, especially with the mating element retaining portion of the element body and the mating separator retaining portion of the separator, the bushing element can thus be prevented from falling out of the bushing receptacle. Through appropriate configuration of the retaining element, the element retaining portion, the separator retaining portion, as well as of the mating element retaining portion and the mating separator retaining portion, an arrangement of the retaining element on both sides of the separator can be made possible.

According to a second aspect of the invention, the object is achieved by a system that is composed of a separator and a bushing element for providing an electrically conductive connection through the separator, the separator having a bushing receptacle into which the bushing element is inserted in a positive or at least substantially positive manner. A system according to the invention is characterized in that the bushing element according to the first aspect of the invention is formed. Any and all advantages that have been described in relation to a bushing element according to the first aspect of the invention can thus also be provided by a system according to the invention according to the second aspect of the invention, which comprises such a bushing element according to the first aspect of the invention.

Furthermore, a system according to the invention can be characterized in that the separator separates a first fluid with a first fluid pressure and a second fluid with a second fluid pressure that is different from the first fluid pressure, the difference between the first fluid pressure and the second fluid pressure generating a fixing force in a fixing direction on the bushing element for the purpose of fixing the bushing element in the bushing receptacle, the fixing direction of the fixing force pointing at least substantially from the first end face of the bushing element to the second end face of the bushing element. In this embodiment of the system, the fixing force can thus be provided by the two fluids, particularly by the pressure difference of the fluid pressures of the two fluids, that are separated by the separator. As already described above in relation to the fixing device of a bushing element according to the invention, secure arrangement and retention of the bushing element in the bushing receptacle can be ensured by a fixing force in a fixing direction at least substantially from the first end face to the second end face of the bushing element. In particular, as an alternative or in addition to a fixing device that is already present or a retaining element of the bushing element, a provision can be made that this fixing force is generated by different fluid pressures from two fluids that are separated by the separator.

BRIEF DESCRIPTION OF THE DRAWINGS

Additional measures that improve upon the invention will become apparent from the following description of various embodiments of the invention, which are shown schematically in the figures. Any and all features that follow from the description or the figures, including structural details and spatial arrangements, can be essential to the invention both individually and in various combinations. Elements with the same function and/or mode of operation are each provided with the same reference symbols in FIGS. 1 to 7.

In the schematic drawing.

DETAILED DESCRIPTION OF THE INVENTION

Figure 1:
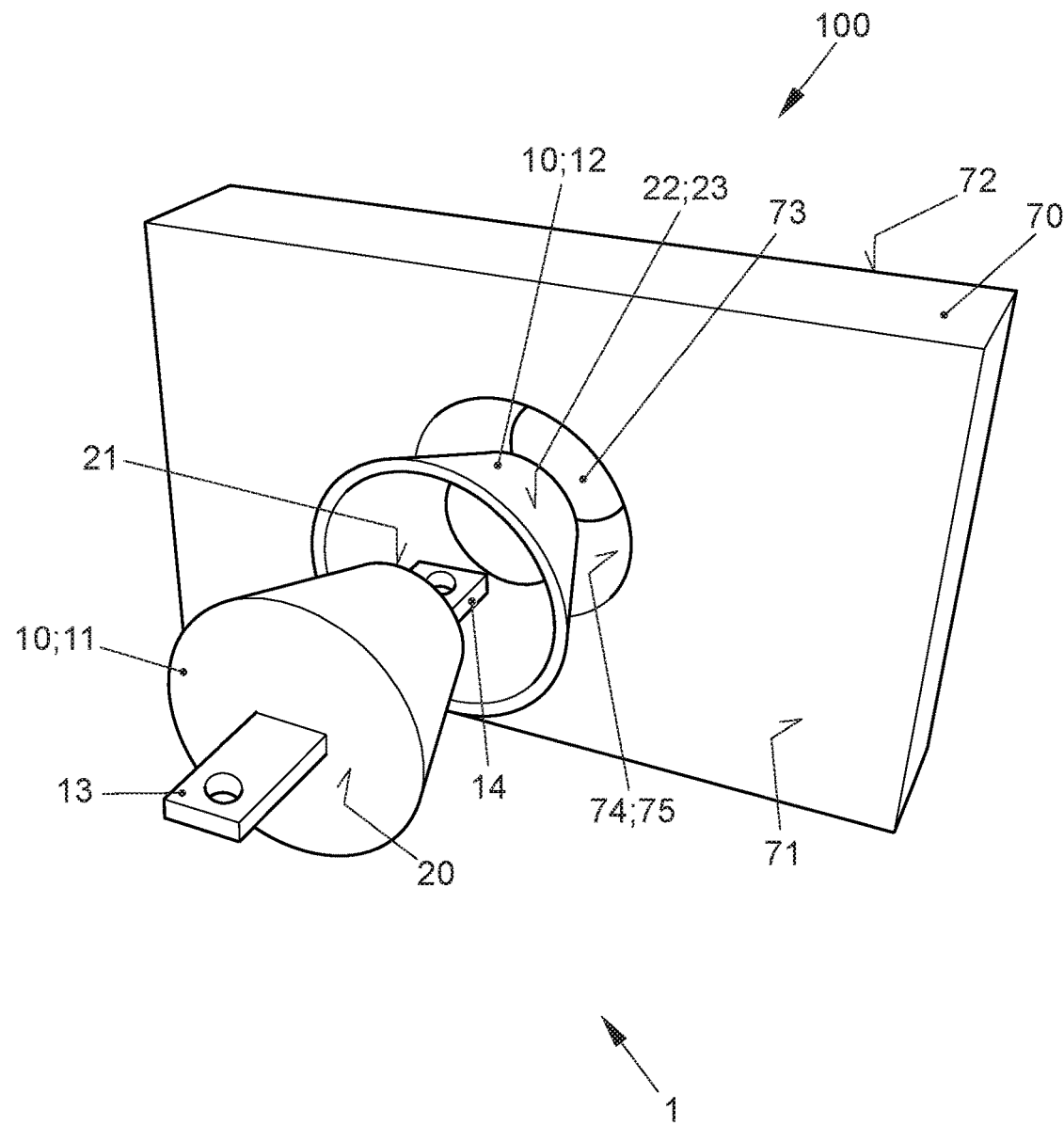
FIG. 1 shows a first embodiment of a system according to the invention.

FIG. 1 shows the essential elements of a system 100 according to the invention, particularly a separator 70 and a bushing element 1 according to the invention. The system 100 is shown in an exploded view. A bushing receptacle 73 is arranged in the separator 70, particularly without interruption between the first surface 71 and the second surface 72 of the separator 70. The bushing receptacle 73 has an inner surface 74 that simultaneously constitutes a mating sealing surface 75 in this embodiment.

As components, the bushing element 1 according to the invention, in turn, essentially has an element body 10 that is divided into a conducting portion 11 and an insulating portion 12. The continuously conductive conducting portion 11 has at its two ends a first connecting portion 13 and a second connecting portion 14 by means of which an electrically conductive connection can be provided by the separator 70. The connecting portions 13, 14 can be used, for example, to fasten cables to the conducting portion 11 of a bushing element 1 according to the invention. According to the invention, the element body 10, particularly the conducting portion 11, has a shape which is such that a first end face 20 has a larger cross-sectional area than a second end face 21. By means of a frustoconical element body 10 as shown, which is particularly formed at least substantially by the likewise frustoconical conducting portion 11, such a shape can be provided in an especially simple manner. The element body 10 has a lateral face 22 between the two end faces 20, 21 which, in this embodiment, is formed substantially by the insulating portion 12. The insulating portion 12 is also used in this embodiment for providing a seal, for which purpose the insulating portion 12 and thus in particular the corresponding lateral face 22 are simultaneously formed as a sealing surface 23. The system 100 according to the invention is shown in an exploded view; in the assembled state, the sealing surface 23 rests positively against the mating sealing surface 75 of the inner surface 74 of the bushing receptacle 73, whereby a secure sealing of the bushing receptacle 73 can be ensured.

Figure 2:
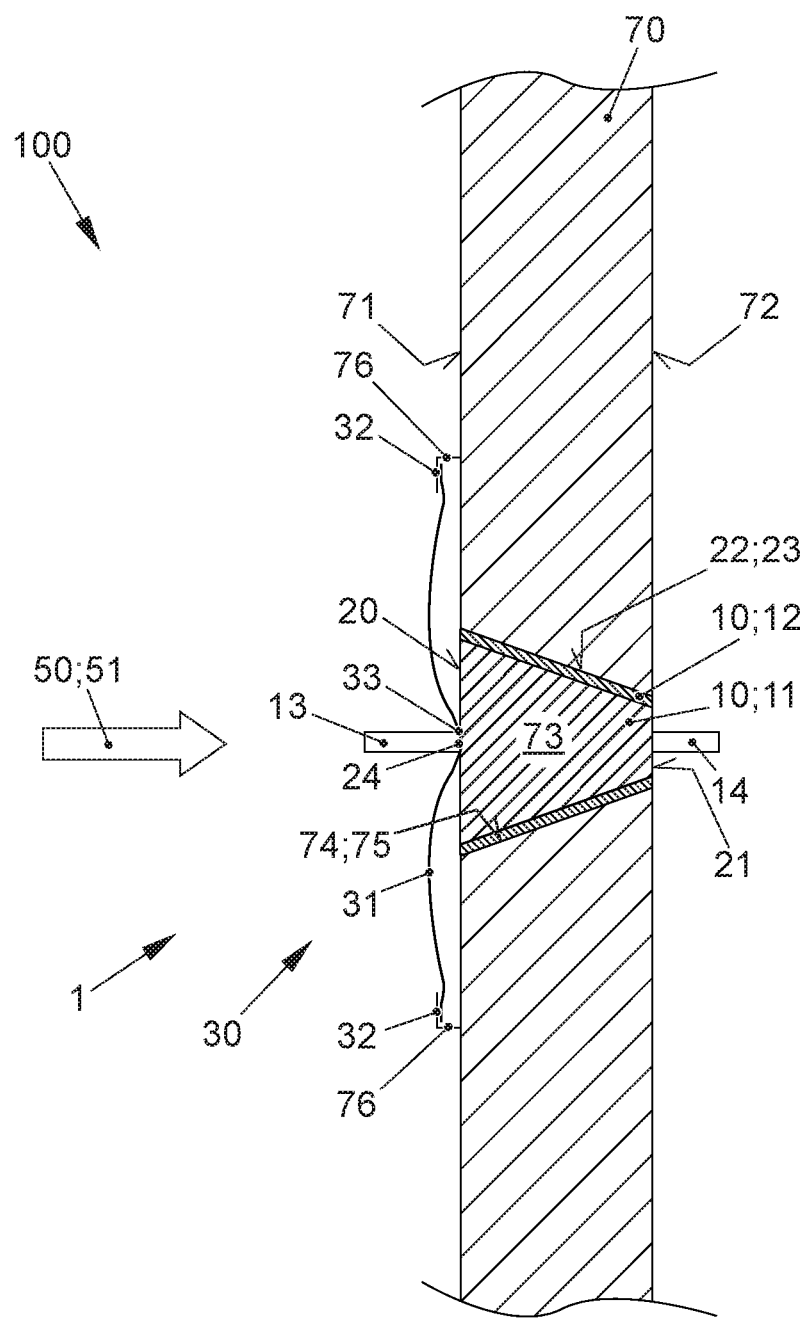
FIG. 2 shows a second embodiment of a system according to the invention.

FIG. 2 shows another possible embodiment of a system 100 according to the invention and, in particular, a bushing element 1 according to the invention, the bushing element 1 additionally having a fixing device 30 in this embodiment. Here, too, the element body 10, particularly the conducting portion 1 and the insulating portion 12, is arranged in the bushing receptacle 73. By means of the insulating element 12—which, in particular, forms the lateral face 22 of the element body 10—a sealing of the two sides of the separator 70 can again be ensured by means of a sealing surface 23 and its positive abutment of a mating sealing surface 75 against the inner surface 74. As shown, a bushing element 1 according to the invention can have a fixing device 30, this fixing device 30 having a first spring element 31 in the illustrated embodiment. This first spring element 31, particularly the first supporting portions 32 of the first spring element 31, are supported by means of first mating supporting portions 76 on a first surface 71 of the separator 70 and conduct a fixing force 50 via a first lead-in portion 33 into a first mating lead-in portion 24 and into the element body 10. By virtue of the illustrated arrangement of the first spring element 31, the fixing force 50 is produced as a pressing fixing force 50, with a fixing direction 51 pointing particularly from the first end face 20 to the second end face 21. In this way, the element body 10 of the bushing element 1 is thus pressed into the bushing receptacle 73 by the fixing force 50, whereby a particularly positive arrangement and retention of the bushing element 1 in the bushing receptacle 73 can be ensured.

Figure 3:
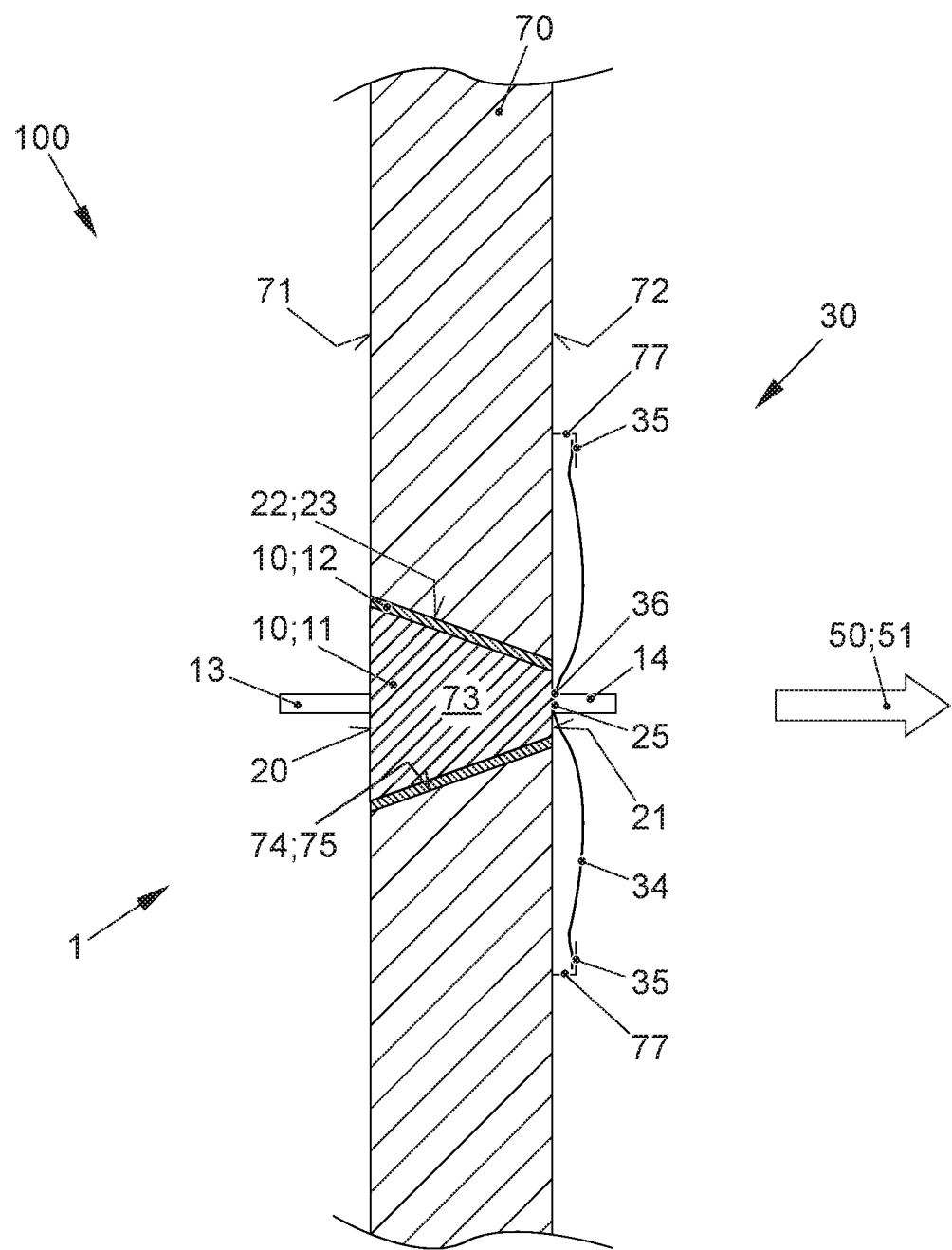
FIG. 3 shows a third embodiment of a system according to the invention.

FIG. 3 shows an alternative or additional embodiment of an inventive bushing element 1 of a system 100 according to the invention; here, unlike in FIG. 2, the fixing device 30 now has a second spring element 34 that is arranged on a second surface 72 of the separator 70. The second spring element 34, in turn, is supported by means of second supporting portions 35 on second mating supporting portions 77 on the second surface 72 of the separator 70 and introduces the fixing force 50 via second lead-in portions 36 into a second mating lead-in portion 25 and into the second end face 21 of the element body 10. The fixing force 50 is thus produced as a tensile fixing force 50, with the fixing direction 50 pointing from the first end face 20 in the direction of the second end face 21 here as well. In this embodiment, the element body 10 of the bushing element 1 is thus sucked into the bushing receptacle 73 and held securely.

Figure 4:
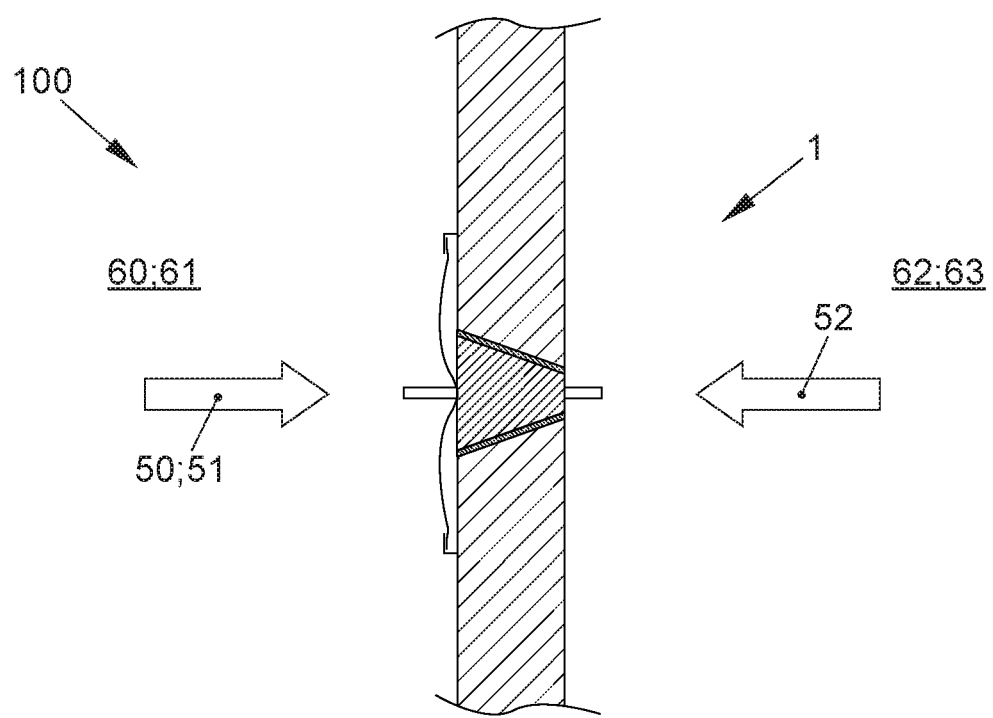
FIG. 4 shows further developments of a system according to the invention.
Figure 4:
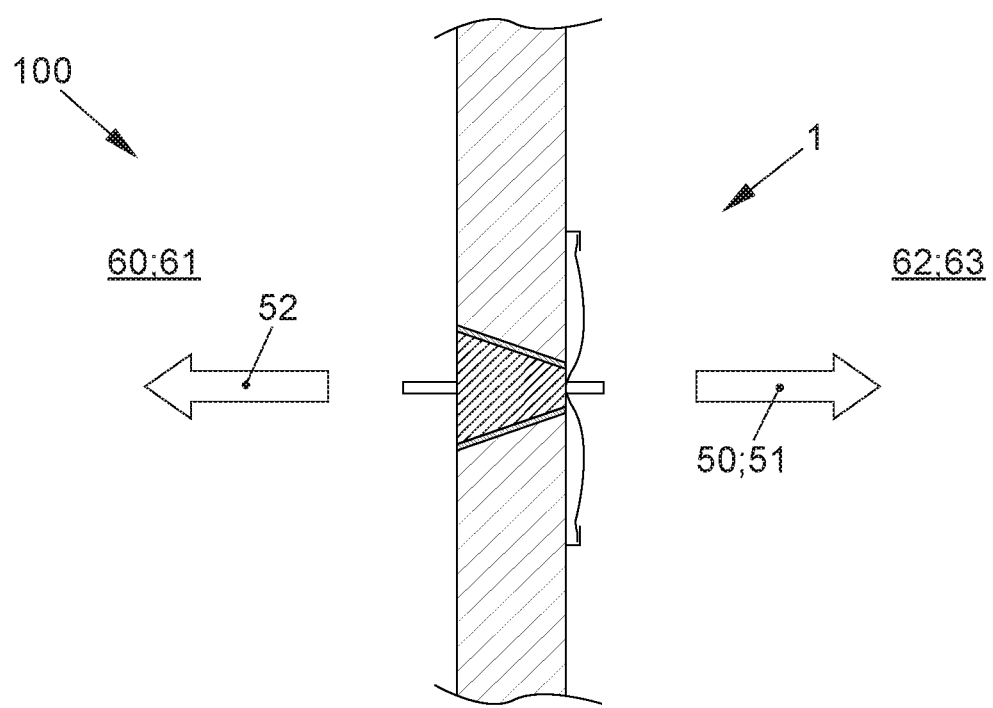

FIG. 4 shows preferred further developments of the embodiments of the systems 100 according to the invention shown in FIGS. 2 and 3 with bushing elements 1 according to the invention. In particular, a provision is made in both cases that a first fluid 60 having a first fluid pressure 61 and a second fluid 62 having a second fluid pressure 63 are separated from one another by the separator 70. The two fluid pressures 61, 63 differ, so that an opening force 52 is generated as a result. One direction of this opening force 52 is particularly counter to the fixing direction 51 of the fixing force 50. If the quantity of the opening force 52 now exceeds a particular adjustable opening threshold value of the fixing force 50, the bushing element 1 according to the invention is pushed out of the bushing receptacle 73, thereby enabling the second fluid 62 to flow in the direction of the first fluid 60 in this embodiment. A use of a bushing element 1 or a system 100 according to the invention as a pressure relief valve can thus be made possible.

Figure 5:
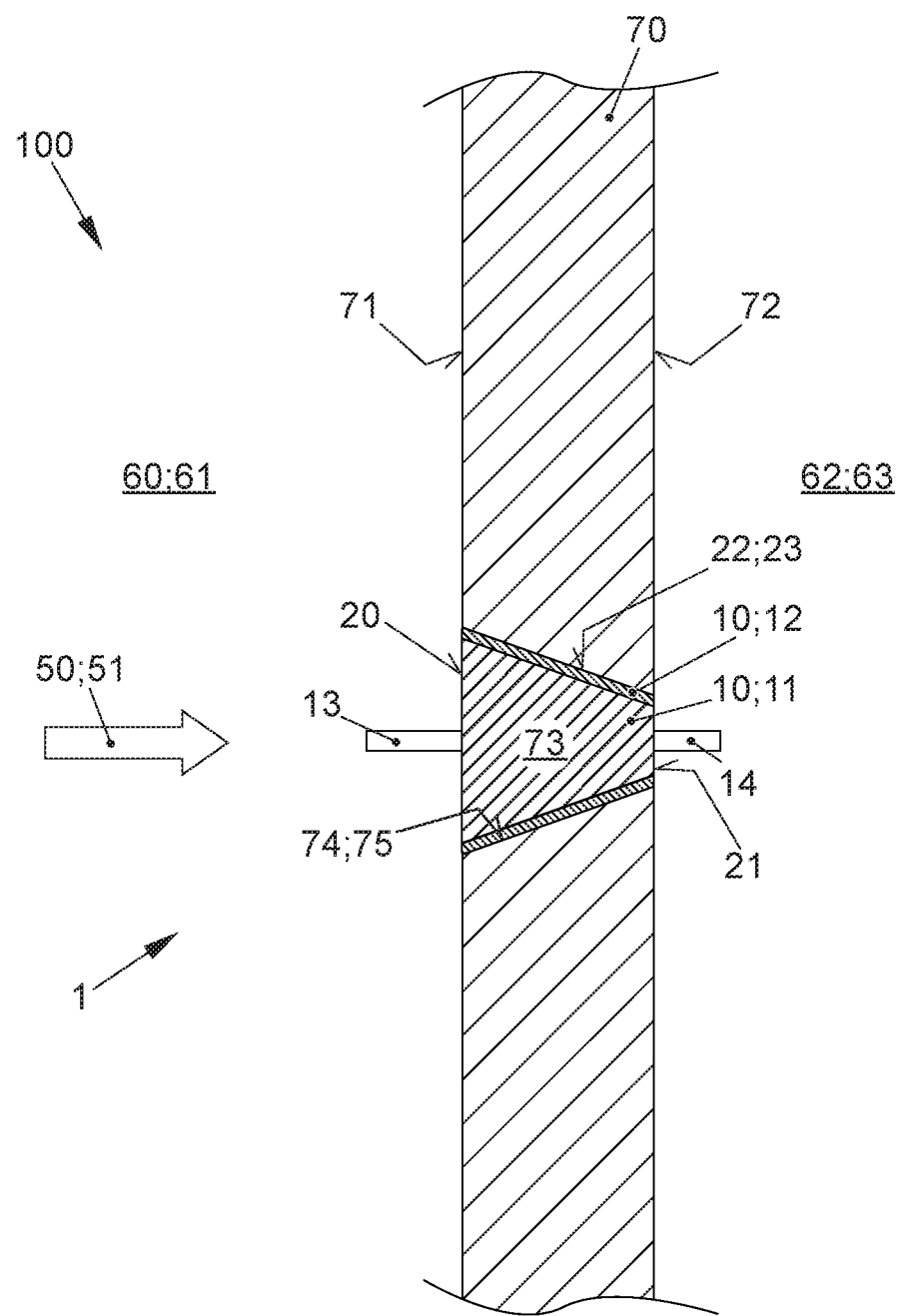
FIG. 5 shows a fourth embodiment of a system according to the invention.
Figure 6:
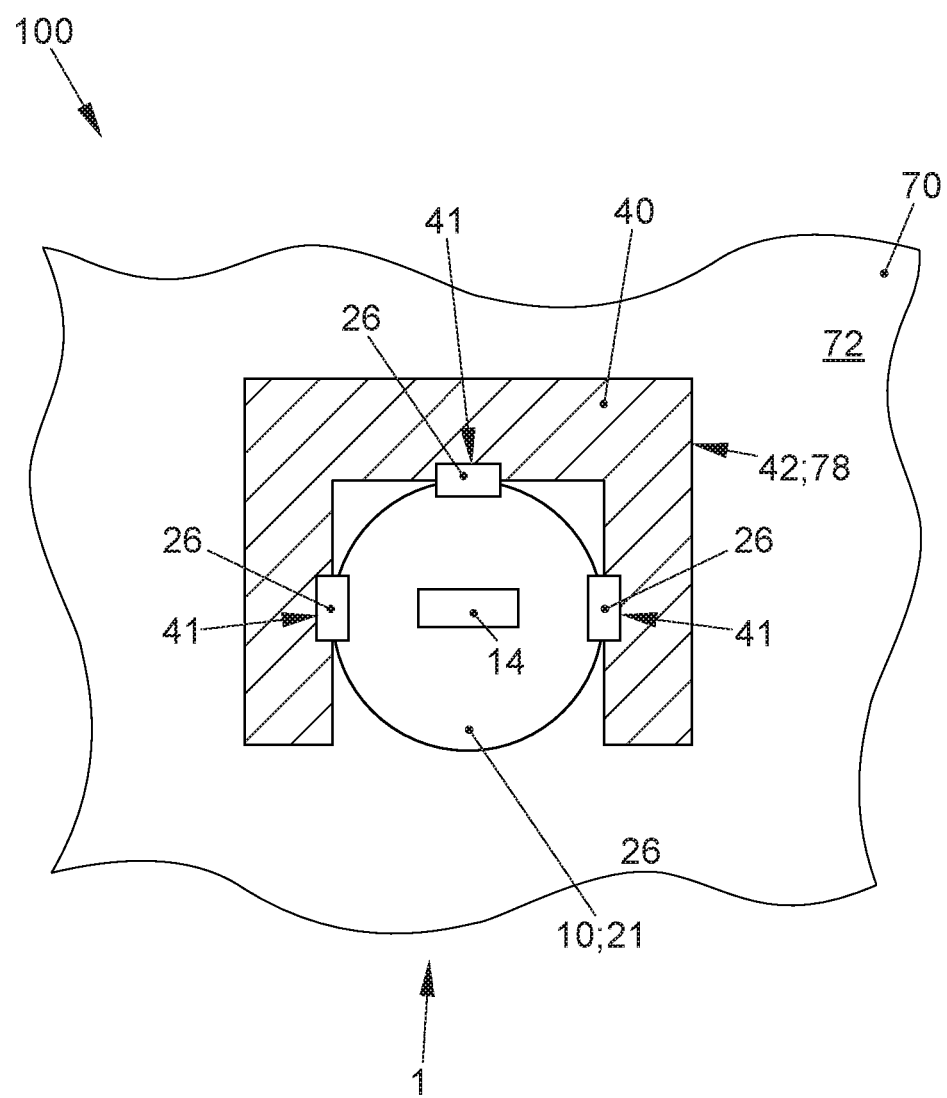
FIG. 6 shows a first view of a fifth embodiment of a system according to the invention.
Figure 7:
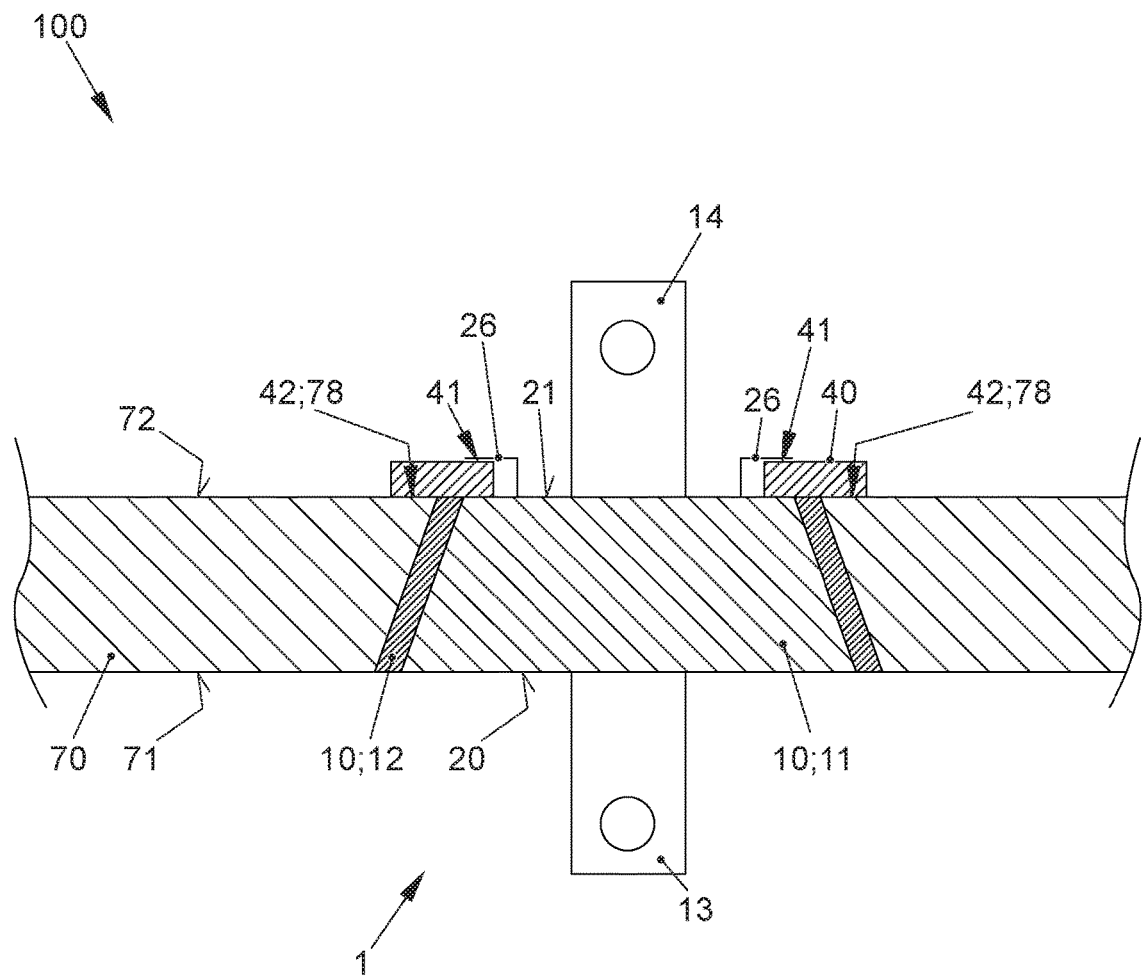
FIG. 7 shows a second view of the fifth embodiment of a system according to the invention shown in FIG. 6.

FIG. 5 shows another alternative or additional embodiment of a system 100 according to the invention with an bushing element 1 according to the invention. In this embodiment as well, a first fluid 60 is separated from a second fluid 62 by the separator 70, the two fluids 60, 62 having different fluid pressures 61, 63. In this case, however, the fluid pressures 61, 63 differ from one another, so that a fixing force 50 is generated that acts in a fixing direction 51 pointing from the first end surface 20 of the element body 10 to the second end surface 21 of the element body 10, whereby the element body 10—particularly the conducting portion 11 and the insulating portion 12—of the bushing element 1 according to the invention is pressed into the bushing receptacle 73. A secure and, in particular, positive arrangement and retention of the bushing element 1 in the bushing receptacle 73 can thus already be provided in this embodiment by the different fluid pressures 61, 63 of the two fluids 60, 62 on the two sides of the separator 70. FIGS. 6 and 7 show different views of another additional and alternative embodiment of a system 100 according to the invention with a bushing element 1 according to the invention, with FIG. 6 showing a plan view and FIG. 7 showing a sectional view. Therefore, FIGS. 6 and 7 are described together in the following. In the illustrated embodiment, a retaining element 40 is provided in particular which provides for secure retention of the bushing element 1 in the bushing receptacle 73 by means of a positive arrangement both against the element body 10 of the bushing element 1 and against a second surface 72 of the separator 70. For this purpose, the retaining element 40 has element retaining portions 41 in particular which can enter into positive engagement with mating element retaining portions 26 of the element body 10. Furthermore, the holding element 40 has a separator holding section 42, which in turn can be brought into positive engagement with a separator retaining portion 78. In this embodiment, the separator retaining portion 42 and the mating separator retaining portion 78 are embodiment as continuous surfaces of the retaining element 40 and of the second surface 72 of the separator 70, respectively, which are or can be adjacently arranged. When this retaining element 40 is used, the assembly of the bushing element 1 in the bushing receptacle 73 is performed as follows, such that the bushing element 1 is inserted or pushed into the bushing receptacle 73, whereafter the retaining element 40 is positively arranged on, particularly inserted into, the mating element retaining portion 26. Removal of the element body 10 or of the entire bushing element 1 from the bushing receptacle 73 can be prevented in this way.

LIST OF REFERENCE SYMBOLS 1 bushing element
10 element body
11 conducting portion
12 insulating portion
13 first connecting portion
14 second connecting portion
20 first end face
21 second end face
22 lateral face
23 sealing surface
24 first mating lead-in portion
25 second mating lead-in portion
26 mating element retaining portion
30 fixing device
31 first spring element
32 first supporting portion
33 first lead-in portion
34 second spring element
35 second supporting portion
36 second lead-in portion
40 retaining element
41 mating element retaining portion
42 separator retaining portion
50 fixing force
51 fixing direction
52 opening force
60 first fluid
61 first fluid pressure
62 second fluid
63 second fluid pressure
70 separator
71 first surface
71 second surface
73 bushing receptacle
74 inner surface
75 mating sealing surface
76 first mating supporting portion
77 second mating supporting portion
78 mating separator retaining portion
100 system

The invention claimed is:

1. A bushing element for providing an electrically conductive connection through a separator, comprising:
an element body for insertion into a bushing receptacle of the separator, the element body comprising a continuously electrically conductive conducting portion for providing the electrically conductive connection and at least one electrically insulating portion for insulating the conducting portion against an inner surface of the bushing receptacle that encloses the conducting portion peripherally at least in part, wherein the element body has a first end face, a second end face opposite the first end face, and a lateral face connecting the first end face and the second end face, with the first end face having a larger cross-sectional area than the second end face, and with the lateral face being formed peripherally at least in part by the insulating portion;
a mating element retaining portion contacting a first portion of the second end face of the element body; and
a retaining element having a first surface and a second surface opposite the first surface, wherein a portion of the first surface of the retaining element contacts an inside surface of the mating element retaining portion, and a portion of the second surface of the retaining element contacts a second portion of the second end face of element body.

2. The bushing element as set forth in claim 1, wherein the element body conducting portion is at least substantially frustoconical in shape.

3. The bushing element as set forth in claim 1, wherein the insulating portion has at least one sealing surface configured to, when the insulating portion is inserted into the bushing receptacle, abut at least one mating sealing surface of the inner surface of the bushing receptacle in a manner that provides a fluid-tight sealing of the bushing receptacle.

4. A system comprising:
a separator, and
a bushing element for providing an electrically conductive connection through the separator, wherein the bushing element comprises:
an element body inserted into a bushing receptacle of the separator,
wherein the element body comprises a continuously electrically conductive conducting portion for providing the electrically conductive connection and at least one electrically insulating portion for insulating the conducting portion against an inner surface of the bushing receptacle that encloses the conducting portion peripherally at least in part, wherein the element body has a first end face, a second end face opposite the first end face, and a lateral face connecting the first end face and the second end face, with the first end face having a larger cross-sectional area than the second end face, and with the lateral face being formed peripherally at least in part by the insulating portion,
a mating element retaining portion contacting a first portion of the second end face of the element body; and
a retaining element having a first surface and a second surface opposite the first surface, wherein a portion of the first surface of the retaining element contacts an inside surface of the mating element retaining portion, and a portion of the second surface of the retaining element contacts a second portion of the second end face of element body.

* * * * *